(12) United States Patent
Nishikawa et al.

(10) Patent No.: US 9,428,245 B2
(45) Date of Patent: Aug. 30, 2016

(54) BICYCLE DRIVE UNIT

(71) Applicant: Shimano Inc., Sakai, Osaka (JP)

(72) Inventors: Yusuke Nishikawa, Osaka (JP); Tetsuya Hino, Osaka (JP)

(73) Assignee: Shimano Inc., Osaka (JP)

( * ) Notice: Subject to any disclaimer, the term of this patent is extended or adjusted under 35 U.S.C. 154(b) by 319 days.

(21) Appl. No.: 13/928,606

(22) Filed: Jun. 27, 2013

(65) Prior Publication Data

US 2014/0121049 A1 May 1, 2014

(30) Foreign Application Priority Data

Oct. 25, 2012 (JP) ................................ 2012-235556

(51) Int. Cl.
*B62M 6/00* (2010.01)
*B62M 6/55* (2010.01)

(52) U.S. Cl.
CPC ........... *B62M 6/55* (2013.01); *Y10T 74/19647* (2015.01)

(58) Field of Classification Search
CPC ... B62M 6/20; B62M 6/55; Y10T 74/19647; F16H 37/02
USPC ......... 180/220, 205.4, 206.4, 206.6; 280/260
See application file for complete search history.

(56) References Cited

U.S. PATENT DOCUMENTS

| | | | | |
|---|---|---|---|---|
| 5,758,736 A * | 6/1998 | Yamauchi | ..................... | 180/220 |
| 6,012,538 A * | 1/2000 | Sonobe et al. | ................ | 180/220 |
| 6,516,908 B2 * | 2/2003 | Tseng | .......................... | 180/206.2 |
| 6,595,072 B2 * | 7/2003 | Liao | .......................... | 73/862.195 |
| 7,516,972 B1 * | 4/2009 | Liao | .............................. | 280/288 |
| 8,651,993 B1 * | 2/2014 | Watarai | .......................... | 475/205 |
| 8,777,791 B1 * | 7/2014 | Hino et al. | ......................... | 475/5 |
| 2011/0303474 A1 * | 12/2011 | Kimmich et al. | .......... | 180/206.3 |
| 2013/0095971 A1 * | 4/2013 | Hino et al. | ......................... | 475/5 |

FOREIGN PATENT DOCUMENTS

| | | |
|---|---|---|
| JP | 08-268375 A | 10/1996 |
| JP | 10-305794 A | 11/1998 |
| JP | 11-70890 A | 3/1999 |
| JP | 2001-106160 A | 4/2001 |
| JP | 3547847 B2 | 4/2004 |
| JP | 2007-071652 A | 3/2007 |
| JP | 2011-068278 A | 4/2011 |

* cited by examiner

*Primary Examiner* — Anne Marie Boehler
(74) *Attorney, Agent, or Firm* — Global IP Counselors

(57) ABSTRACT

A drive unit has three axles, three rotation transmitting members and an acting force detecting unit. The first axle is configured to be rotated by a crank arm. The first rotation transmitting member is arranged on the first axle to transmit rotation of the first axle by the crank arm. The second axle is spaced from the first axle. The second rotation transmitting member is arranged on the second axle, and is operatively engaged with the first rotation transmitting member to transmit rotation of the first rotation transmitting member. The third axle is spaced from the first axle and the second axle. The third rotation transmitting member is arranged on the third axle, and operatively engaged with the second rotation transmitting member to transmit rotation of the second rotation transmitting member. The acting force detecting unit arranged to detect a force acting on the second axle.

22 Claims, 8 Drawing Sheets

BICYCLE DRIVE UNIT

CROSS-REFERENCE TO RELATED APPLICATIONS

This application claims priority under 35 U.S.C. §119 to Japanese Patent Application No. 2012-235556, filed Oct. 25, 2012. The entire disclosure of Japanese Patent Application No. 2012-235556 is hereby incorporated herein by reference.

BACKGROUND

1. Field of the Invention

This invention generally relates to a drive unit. More specifically, the present invention relates to a drive unit arranged in the vicinity of a crank of a bicycle.

2. Background Information

An electrically assisted bicycle is disclosed in Japanese Patent No. 3547847 that uses a motor output of a drive unit as assisting power. The drive unit described in this Japanese Patent has a crank axle, a housing supporting the crank axle, a motor accommodated in the housing, a gear unit, a gear holder, and a pedaling force detecting device. The gear holder has a gear unit accommodated in the gear holder, such that the gear holder can rotate freely with respect to the crank axle. The gear unit has a plurality of gears that transmits the rotation of the crank axle to the sprocket. The pedaling force detecting device is installed in the housing, and the pedaling force detecting device detects a rotating movement around the crank axle and acting on the gear holder.

SUMMARY

The bicycle drive unit of the above described Japanese Patent detects the gear holder that rotates around the crank axle for detecting the pedaling force of the rider. With this configuration, the pedaling force detecting device for detecting the pedaling force is quite complicated.

The present invention was conceived in view of the problem previously described. One object of the present invention is to provide a bicycle drive unit that has a simple configuration for detecting a pedaling force in the bicycle drive unit.

In accordance with a first aspect of the present invention, a bicycle drive unit is provided that basically comprises a first axle, a first rotation transmitting member, a second axle, a second rotation transmitting member, a third axle, a third rotation transmitting member, and an acting force detecting unit. The first axle is configured to be rotated by a crank arm. The first rotation transmitting member is arranged on the first axle to transmit rotation of the first axle by the crank arm. The second axle is spaced from the first axle. The second rotation transmitting member is arranged on the second axle, and is operatively engaged with the first rotation transmitting member to transmit rotation of the first rotation transmitting member. The third axle is spaced from the first axle and the second axle. The third rotation transmitting member is arranged on the third axle, and operatively engaged with the second rotation transmitting member to transmit rotation of the second rotation transmitting member. The acting force detecting unit is arranged to detect a force acting on the second axle.

In this drive unit, the pedaling force is detected by detecting the force acting on the second axle, which is obtained as the rotation of the first axle is transmitted and which transmits the rotation to the third axle, instead of the force acting on the first axle. The force acting on the second axle is generated only due to the transmission of the rotating force from the first rotation transmitting member to the second rotation transmitting member and the transmission of the rotating force from the second rotation transmitting member to the third rotation transmitting member. Consequently, the pedaling force can be detected by detecting the force acting on the second axle without arranging the gear holder or similar members. As a result, the pedaling force can be detected with a simpler configuration in the bicycle drive unit.

In accordance with a second aspect of the present invention, the bicycle drive unit according to the first aspect is configured so that the first rotation transmitting member is engaged with the second rotation transmitting member to apply a first acting force component of the force acting on the second axle that acts in a radial direction of the second axle due to transmission of the rotation from the first rotation transmitting member to the second rotation transmitting member. Also in this second aspect of the present invention the bicycle drive unit according to the first aspect is configured so that the second rotation transmitting member is engaged with the third rotation transmitting member to apply a second acting force component of the force acting on the second axle that acts in the radial direction of the second axle due to transmission of the rotation from the second rotation transmitting member to the third rotation transmitting member. In this case, it is possible to detect with a high degree of precision the force acting on the second axle as the sum force of the first acting force component and the second acting force component acting on the second axle.

In accordance with a third aspect of the present invention, the bicycle drive unit according to the first or second aspect is configured so that the acting force detecting unit has a supporting part that supports the second axle and a sensor that detects the force acting on the second axle via the supporting part. In this case, as no sensor is arranged on the second axle, while a sensor is arranged on the supporting part that supports the second axle, the sensor can be easily arranged, and the operation for laying wires to the sensor can be easily carried out.

In accordance with a fourth aspect of the present invention, the bicycle drive unit according to the third aspect is configured so that the sensor is arranged to directly detect a strain of the supporting part, which is generated by the force acting on the second axle. In this case, as the strain of the supporting part generated by the force acting on the second axle can be directly detected, it is possible to detect with a high degree of precision the force acting on the second axle.

In accordance with a fifth aspect of the present invention, the bicycle drive unit according to the fourth aspect is configured so that the supporting part has an axle supporting portion that supports an end portion of the second axle, and a strain-generating portion in contact with the axle supporting portion. As a result, the force acting on the second axle can be detected at an even higher precision.

In accordance with a sixth aspect of the present invention, the bicycle drive unit according to the fourth or fifth aspect is configured so that the sensor includes a strain gauge element.

In accordance with a seventh aspect of the present invention, the bicycle drive unit according to any one of the third through sixth aspects further comprises a housing accommodating the first rotation transmitting member, the second rotation transmitting member and the third rotation transmitting member, and the supporting part is supported in the housing. In this case, the first rotation transmitting member, the second rotation transmitting member and the third rotation transmitting member can be held with a high stability.

In accordance with an eighth aspect of the present invention, the bicycle drive unit according to any one of the first through seventh aspects is configured so that the second rotation transmitting member is rotatably supported on the second axle to rotate with respect to the second axle. In this case, the second rotation transmitting member rotates, while the second axle does not rotate, so that the force acting on the second axle can be detected easily.

In accordance with a ninth aspect of the present invention, the bicycle drive unit according to any one of the first through eighth aspects is configured so that the third rotation transmitting member is rotatably supported on the third axle to rotate with respect to the third axle.

In accordance with a tenth aspect of the present invention, the bicycle drive unit according to any one of the first through ninth aspects is configured so that the first axle, the second axle and the third axle are arranged parallel with respect to each other. In this case, the second axle and the third axle that support the second rotation transmitting member and the third rotation transmitting member that transmit the rotation of the first axle are arranged parallel with the first axle. Consequently, it is possible to use gears, sprockets, pulleys, etc. in the various rotation transmitting members. As a result, the first rotation transmitting member, the second rotation transmitting member and the third rotation transmitting member can have a simple structure.

In accordance with an eleventh aspect of the present invention, the bicycle drive unit according to any one of the first through tenth aspects is configured so that the first rotation transmitting member and the second rotation transmitting member are in direct contact with each other. In this case, the first rotation transmitting member, the second rotation transmitting member and the third rotation transmitting member have a simple structure. In particular, when the sprockets or pulleys are adopted, it is possible to relax the restriction on the configuration of each axle and the remaining axles, so that there is a greater degree of freedom in the design of the drive unit.

In accordance with a twelfth aspect of the present invention, the bicycle drive unit according to any one of the first through ninth aspects further comprises a first connecting member transmitting the rotation of the first rotation transmitting member to the second rotation transmitting member. In this case, it is easy to reduce the size of the drive unit.

In accordance with a thirteenth aspect of the present invention, the bicycle drive unit according to any one of the first through eleventh aspects further comprises a first connecting member transmitting the rotation of the first rotation transmitting member to the second rotation transmitting member. In this case, the restriction on the configuration of the first rotation transmitting member and the second rotation transmitting member is relaxed.

In accordance with a fourteenth aspect of the present invention, the bicycle drive unit according to any one of the first through thirteenth aspects is configured so that the second rotation transmitting member and the third rotation transmitting member are in direct contact with each other. In this case, it is easy to reduce the size of the drive unit.

In accordance with a fifteenth aspect of the present invention, the bicycle drive unit according to any one of the first through thirteenth aspects further comprises a second connecting member transmitting the rotation of the second rotation transmitting member to the third rotation transmitting member. In this case, the restriction on the configuration of the second rotation transmitting member and the third rotation transmitting member is relaxed.

In accordance with a sixteenth aspect of the present invention, the bicycle drive unit according to the thirteenth or fifteenth aspect further comprises a first connecting member and a second connecting member. The first connecting member transmits the rotation of the first rotation transmitting member to the second rotation transmitting member. The second connecting member transmits the rotation of the second rotation transmitting member to the third rotation transmitting member. The first connecting member and the second connecting member being selected from the group consisting of chains or belts.

In accordance with a seventeenth aspect of the present invention, the bicycle drive unit according to any one of the first through twelfth aspects further comprises a chain engaged a first sprocket of the second rotation transmitting member and a second sprocket of the third rotation transmitting member to transmit the rotation of the second rotation transmitting member to the third rotation transmitting member. The first rotation transmitting member includes a first gear and the second rotation transmitting member includes a second gear engaged with the first gear. The first sprocket is connected to the second gear such that the first sprocket rotates with the second gear as a unit. In this case, it is possible to have the second rotation transmitting member and the third rotation transmitting member rotate in the same direction.

In accordance with an eighteenth aspect of the present invention, the bicycle drive unit according to any one of the first through seventeenth aspects further comprises a power transmission unit and a motor. The power transmission unit transmits a rotating force of the third rotation transmitting member. The motor is operatively coupled to the power transmission unit to apply a driving force on the power transmission unit. In this case, the rotation of the motor is applied on the power transmission unit that makes the crank rotate, and it is thus possible to realize the assisting function in assisting the driving.

In accordance with a nineteenth aspect of the present invention, the bicycle drive unit according to the eighteenth aspect is configured so that the first axle and a rotating axle of the motor are arranged coaxially. In this case, it is possible to simplify the internal mechanism of the motor, so that the drive unit can be further simplified.

In accordance with a twentieth aspect of the present invention, the bicycle drive unit according to the eighteenth or nineteenth aspect further comprises a transmission mechanism arranged in the power transmission path between the third rotation transmitting member and the power transmission unit. In this case, it is possible to select from plural gear ratios by the transmission mechanism, so that the assisted driving by the motor can be carried out. Here, even when an internal transmission is used as the transmission mechanism, the drive force of the motor still does not act on the transmission mechanism, so that the force can make the transmission operation at any timing.

In accordance with a twenty-first aspect of the present invention, the bicycle drive unit according to any one of the eighteenth through twentieth aspects further comprises a one-way clutch arranged to transmit a drive force of the motor to the power transmission unit. In this case, it is possible to prevent the pedaling force from being transmitted to the motor.

In accordance with a twenty-second aspect of the present invention, the bicycle drive unit according to the any one of the first through twenty-first aspects is configured so that the first axle is a crank axle, and the first rotation transmitting member is fixed on the first axle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
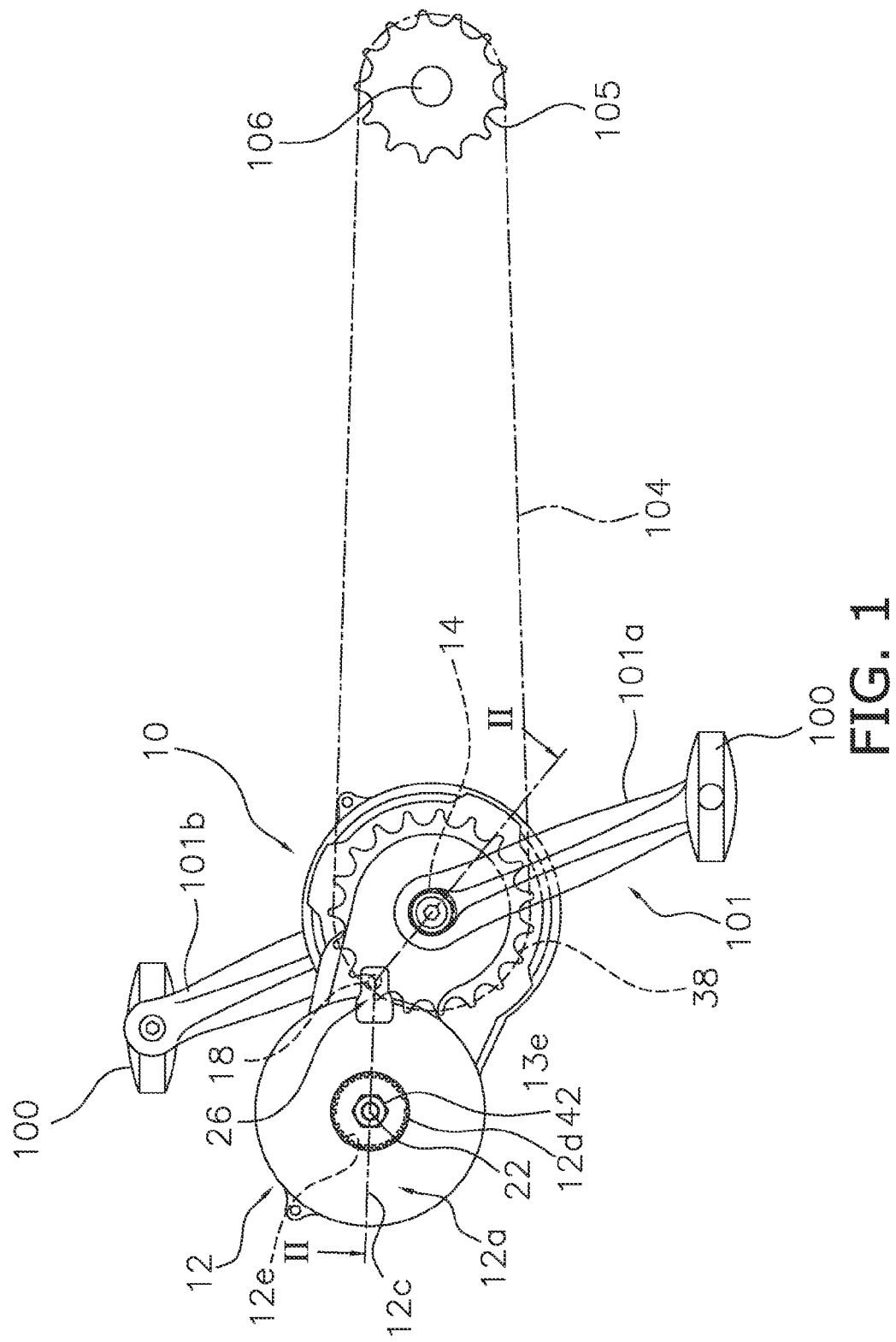
FIG. 1 is a left side elevational view of a drive train of an electrically assisted bicycle that is equipped with a drive unit in accordance with one embodiment.

Referring initially to FIG. 1, a left side of a drive train of an electrically assisted bicycle is illustrated that is equipped with a drive unit 10 in accordance with a first embodiment.

FIG. 1 shows only the portion related to the driving portion. For this electrically assisted bicycle, the pedaling force acting on a pair of pedals 100 is transmitted to the hub body arranged in a rotatable way around a vehicle axle 106 of a rear wheel after going through the following path: first and second crank arms 101a and 101b→the drive unit 10→a front sprocket 38→a first chain 104→a rear sprocket 105. In this configuration, the drive unit 10 combines the motor output as the assisting power to assist riding the bicycle. In this electrically assisted bicycle, the sensor unit 26 to be explained later detects the force corresponding to the torque acting on the crank axle 14. Here, for this electrically assisted bicycle, if the detected value is over a prescribed level, the motor is started to generate a torque as the assisting power corresponding to the pedaling force. The drive unit 10 containing the assisting motor is usually arranged in the vicinity of the connecting section between the lower end portion of the seat tube of the frame and the rear end portion of the down tube of the frame. The battery for the motor driving is arranged along the rear carrier, the down tube or the seat tube.

Figure 2:
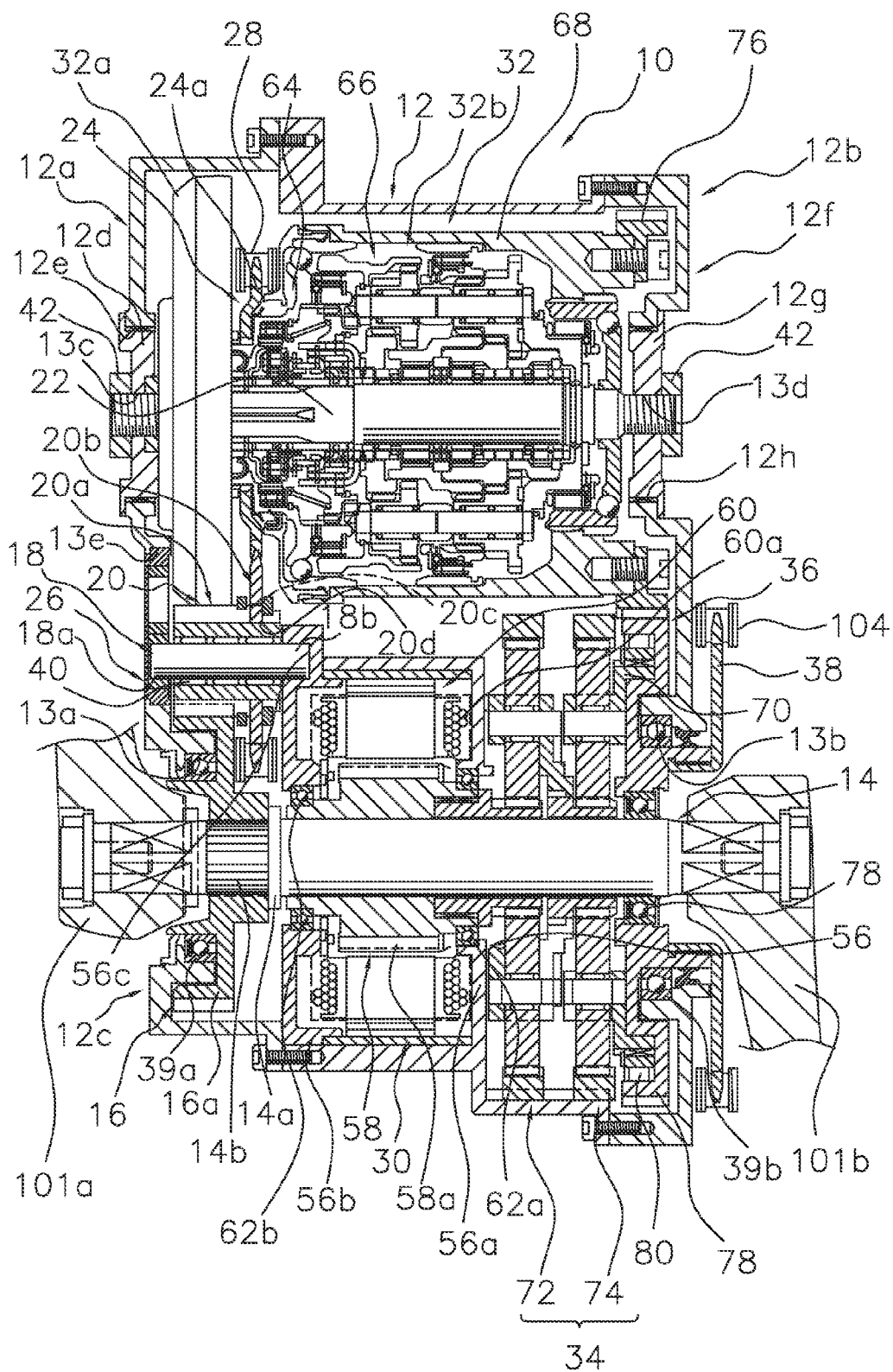
FIG. 2 is a cross-sectional view of the drive unit of FIG. 1 as seen along section line II-II in FIG. 1 for illustrating the internal parts of the drive unit.

The drive unit 10 is arranged in the vicinity of the crank 101 that has the first crank arm 101a and the second crank arm 101b. As shown in FIG. 2, the drive unit 10 has a housing 12, a crank axle 14, a first rotation transmitting member 16, an intermediate axle 18, a second rotation transmitting member 20, a supporting axle 22, a third rotation transmitting member 24 and a sensor unit 26. Here, the crank axle 14 is an example of the first axle. The intermediate axle 18 is an example of the second axle. The supporting axle 22 is an example of the third axle. The sensor unit 26 is an example of the acting force detecting unit.

The axle central portion of the crank axle 14, the axle central portion of the intermediate axle 18 and the axle central portion of the supporting axle 22 are arranged away from each other. The crank axle 14, the intermediate axle 18 and the supporting axle 22 are arranged to extend parallel with each other. The drive unit 10 also has a second chain 28, a motor 30, a transmission mechanism 32, a reduction gear unit 34, a power transmission unit (output section) 36, and a front sprocket 38.

As shown in FIG. 2, the housing 12 accommodates the first rotation transmitting member 16, the second rotation transmitting member 20, the third rotation transmitting member 24, the power transmission unit 36, the motor 30, the transmission mechanism 32 and the reduction gear unit 34.

The housing 12 is a member made of, for example, aluminum or another metal. The housing 12 has a first side wall 12a and a second side wall 12b. The first side wall 12a and the second side wall 12b are arranged separated from and facing each other in the axial direction of the crank axle 14. The housing 12 has a housing main body containing the second side wall 12b and a lid member containing the first side wall 12a. The lid member is anchored detachably on the opening of the housing main body by bolts or other anchoring members to form an accommodating space for accommodating the first rotation transmitting member 16, the second rotation transmitting member 20, the third rotation transmitting member 24, the power transmission unit 36, the motor 30, the transmission mechanism 32, and the reduction gear unit 34. The first side wall 12a has a first side wall main body 12c and a first plate member 12d. The first plate member 12d is detachably installed, but not rotatable on the first engagement hole 12e formed on the first side wall main body 12c. The second side wall 12b has a second side wall main body 12f and a second plate member 12g. The second plate member 12g is installed detachably but not rotatable on the second engagement hole 12h formed on the second side wall main body 12f. The first engagement hole 12e is arranged coaxial with the second engagement hole 12h.

The first plate member 12d and the second plate member 12g are preferably made of a metal material different from the first side wall main body 12c and the second side wall main body 12f. The first plate member 12d is installed detachably from the outer side of the housing 12 on the first side wall main body 12c. The second plate member 12g is installed detachably from the outer side of the housing 12 on the second side wall main body 12f. The first plate member 12d and the second plate member 12g are formed here as round plates, with serrations and flanges for engagement with the first engagement hole 12e formed on their outer peripheral portions. The serration of the first plate member 12d is engaged with the first engagement hole 12e, and the serration of the second plate member 12g is engaged with the second engagement hole 12h. The flange of the first plate member 12d is in contact with the side surface of the first side wall main body 12c, and the flange of the second plate member 12g is in contact with the side surface of the second side wall main body 12f. On the first engagement hole 12e, a serration for engagement with the serration of the first plate member 12d is formed. By this serration, the first plate member 12d is locked to the first side wall main body 12c. On the second engagement hole 12h, a serration for engagement with the serration of the second plate member 12g is formed; by this serration, the second plate member 12g is locked to the second side wall main body 12f. By fastening the nut 42 installed on the supporting axle 22 that supports the transmission mechanism 32, the first plate member 12d and the second plate member 12g are pressed towards each other; also, the first plate member 12d is anchored with respect to the first side wall main body 12c, while the second plate member 12g is anchored with respect to the second side wall main body 12f, respectively.

The housing 12 has a pair of round shaped first holes 13a and 13b, a pair of second holes 13c and 13d and a third hole 13e. The first holes 13a and 13b are formed on the first side wall main body 12c and the second side wall main body 12f, respectively. In the first hole 13a, for example, a first bearing 39a, such as a ball bearing, is arranged. In the first hole 13b, a second bearing 39b, such as, for example, a ball bearing, is arranged.

The second holes 13c and 13d are formed on the first plate member 12d and the second plate member 12g. In the second holes 13c and 13d, the supporting axle 22 is installed in a non-rotatable way. The second holes 13c and 13d are formed at the centers of the first plate member 12d and the second plate member 12g, respectively. Here, the first plate member 12d is installed detachably on the first side wall main body 12c, and the second plate member 12g is installed detachably on the second side wall main body 12f. However, one can also use a scheme in which the first plate member 12d is pressed in and integrated with the first side wall main body 12c, and the second plate member 12g is pressed in and integrated with the second side wall main body 12f. Also, the second holes 13c and 13d may be formed offset from the centers of the first plate member 12d and the second plate member 12g, respectively. In this case, the structure is such that, as the first plate member 12d and the second plate member 12g are rotated in the circumferential direction, the positions of the second holes 13c and 13d can be changed, and it is possible to adjust the slack of the second chain 28.

Figure 3:
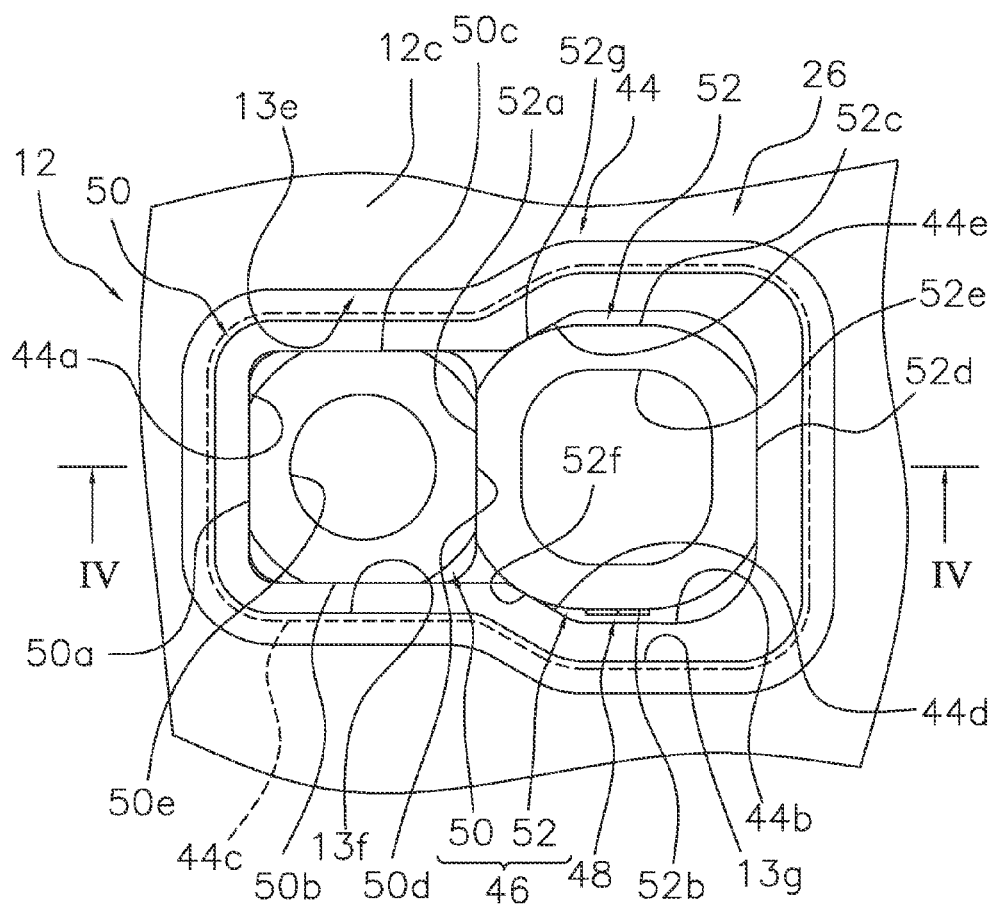
FIG. 3 is an enlarged side elevational view of a sensor unit of the drive unit illustrated in FIGS. 1 and 2.
Figure 4:
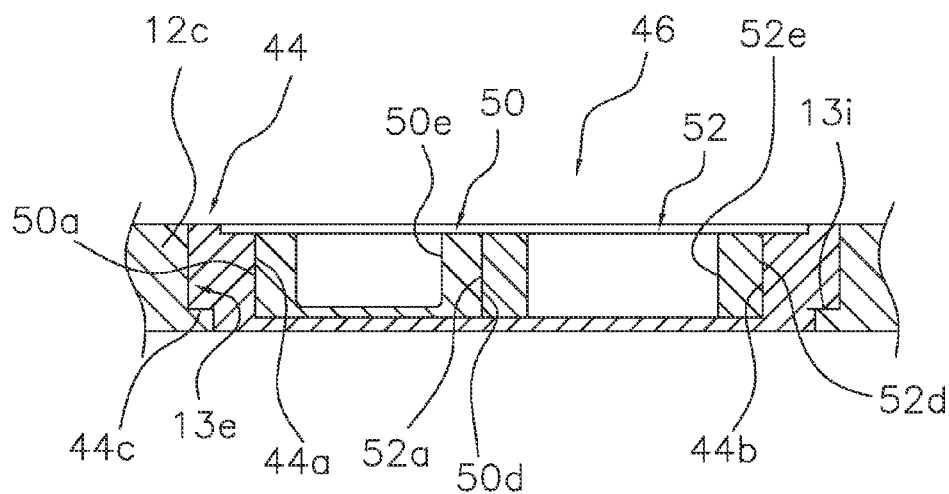
FIG. 4 is a cross-sectional view of the sensor unit as seen along section line IV-IV in FIG. 3.

As shown in FIGS. 3 and 4, the third hole 13e is formed on the side wall on one side of the housing 12. Here, the third hole 13e is formed on the first side wall main body 12c. In the third hole 13e, the sensor unit 26 is arranged. The third hole 13e is formed in a roughly rectangular shape as viewed in the width direction (the direction where the crank axle 14 extends) of the housing 12. As explained later, the sensor unit 26 includes an axle supporting portion 50 and a strain generating section 52. The third hole 13e has a first portion 13f where the axle supporting portion 50 is arranged. The third hole 13e has a second portion 13g where the strain generating section 52 to be explained later is arranged. On the periphery of the third hole 13e, a holding recession 13i dipping from the inner wall surface of the housing 12 is formed. The holding recession 13i has a configuration that allows positioning of the sensor case 44, which is to be explained later, and can prohibit the outward movement of the housing 12. Here, the third hole 13e is a through hole. However, the third hole 13e may also be a recession or a groove formed on the inner wall of the housing 12.

The crank axle 14 is a metal axle member made of, for example, iron, stainless steel, or the like. The crank axle 14 is supported in a free rotatable way by the first bearing 39a and the second bearing 39b. The two ends of the crank axle 14 are arranged to protrude out from the first side wall 12a and the second side wall 12b, respectively. On the end portion of the crank axle 14 on the side of the first side wall 12a, a first crank arm 101a is detachably installed to rotate together with the crank axle 14 as a unit. On the end portion of the crank axle 14 on the side of the second side wall 12b, a second crank arm 101b is detachably installed to rotate together with the crank axle 14 as a unit. In the end portion of the crank axle 14 on the side of the first side wall main body 12c includes a large-diameter flange section 14a and a serration section 14b. The large-diameter flange section 14a and the serration section 14b are monolithically formed. The large-diameter flange section 14a is provided for positioning the first rotation transmitting member 16 in the axial direction. The serration section 14b is provided for connecting with the first rotation transmitting member 16 so that they can rotate as a unit. The large-diameter flange section 14a and the serration section 14b are arranged adjacent to each other. The flange section 14a may be formed on the entire circumference in the circumferential direction of the crank axle 14. Alternatively, the flange section can be formed intermittently in the circumferential direction and protruding out from the crank axle 14.

The first rotation transmitting member 16 is arranged on the crank axle 14, and transmits the rotation of the first crank arm 101a and the second crank arm 101b. The first rotation transmitting member 16 includes a first gear 16a made of, for example, a synthetic resin or a metal. The first gear 16a is connected to the serration section 14b of the crank axle 14 so that the first gear and the crank axle 14 can rotate together monolithically. The first gear 16a is anchored on the crank axle 14 by press-in, bonding or another appropriate anchoring means. The first gear 16a makes contact with the flange section 14a of the crank axle 14 so that the first gear is positioned in the axial direction of the crank axle 14. The first gear 16a is supported via the first bearing 39a in the housing 12 in a freely rotatable way. Consequently, according to the present embodiment, the crank axle 14 is supported by the first bearing 39a and the first gear 16a in a freely rotatable way.

The intermediate axle 18 is an axle member made of iron, stainless steel or another metal. The intermediate axle 18 has a first end portion 18a arranged at the third hole 13e and a second end portion 18b arranged on the side opposite to the first end portion 18a. The first end portion 18a is supported by the supporting part 46, which is to be explained later, of the sensor unit 26 installed in the third hole 13e. The second end portion 18b is supported by the second case 56b of the motor case 56, which is to be explained later, of the motor 30. The intermediate axle 18 is anchored on the supporting part 46 and the second case 56b to be explained later. The intermediate axle 18 supports the second rotation transmitting member 20 in a freely rotatable way.

The second rotation transmitting member 20 is a member that transmits the rotation of the first rotation transmitting member 16. The second rotation transmitting member 20 includes a second gear 20a and a first sprocket 20b. The second gear 20a is in direct contact with and engaged with the first gear 16a. The first sprocket 20b rotates together with the second gear 20a as a unit. The second rotation transmitting member 20 is a member made of, for example, a synthetic resin or a metal. The second rotation transmitting member 20 is supported in a freely rotatable way on the intermediate axle 18 via the bearing 40 as, for example, a needle-shaped roller bearing. The second gear 20a has an engagement section 20c engaged with the inner peripheral portion 20d of the first sprocket 20b. The engagement section 20c is formed to contain a tooth surface not engaged with the first gear 16a among the tooth surface of the second gear 20a. On the inner peripheral portion 20d of the first sprocket 20b, a concavo-convex portion is formed that is engaged with at least a portion of the second gear 20a. As a result, the rotation of the second gear 20a and the first sprocket 20b is prohibited. On the second gear 20a, a prohibiting section that prohibits movement of the first sprocket 20b in the direction towards the intermediate axle 18 is arranged. This prohibiting section is arranged on both sides of the first sprocket 20b in the intermediate axle 18 direction.

The supporting axle 22 is arranged to support the transmission mechanism 32. The supporting axle 22 has two ends that go through the two holes 13c and 13d. The two end portions of the supporting axle 22 are anchored by nuts 42 on the first plate member 12d and the second plate member 12g. As a result, they are anchored on the first side wall 12a and the second side wall 12b, respectively. The supporting axle 22 goes through a transmission motor unit 32a, a rotation input section 64 and a transmission section 66 the transmission mechanism 32 as explained later. The supporting axle 22 supports the third rotation transmitting member 24 in a freely rotatable way.

The third rotation transmitting member 24 is a member that transmits the rotation of the second rotation transmitting member 20. The rotation of the second rotation transmitting member 20 is transmitted by the second chain 28 to the third rotation transmitting member 24. The second chain 28 is an example of the second connecting member. The third rotation transmitting member 24 has a second sprocket 24a engaged with the second chain 28. The second chain 28 is wound on the first sprocket 20b and the second sprocket 24a. The second sprocket 24a is connected to the rotation input section 64 of the transmission mechanism 32. The second sprocket 24a is supported on the supporting axle 22 via the rotation input section 64. The second sprocket 24a and the rotation input section 64 are connected so that they can rotate together as a unit. The rotation input section 64 is supported on the supporting axle 22 in a freely rotatable way. As a result, the second sprocket 24a is supported via the rotation input section 64 on the supporting axle 22 in a freely rotatable way.

Figure 6:
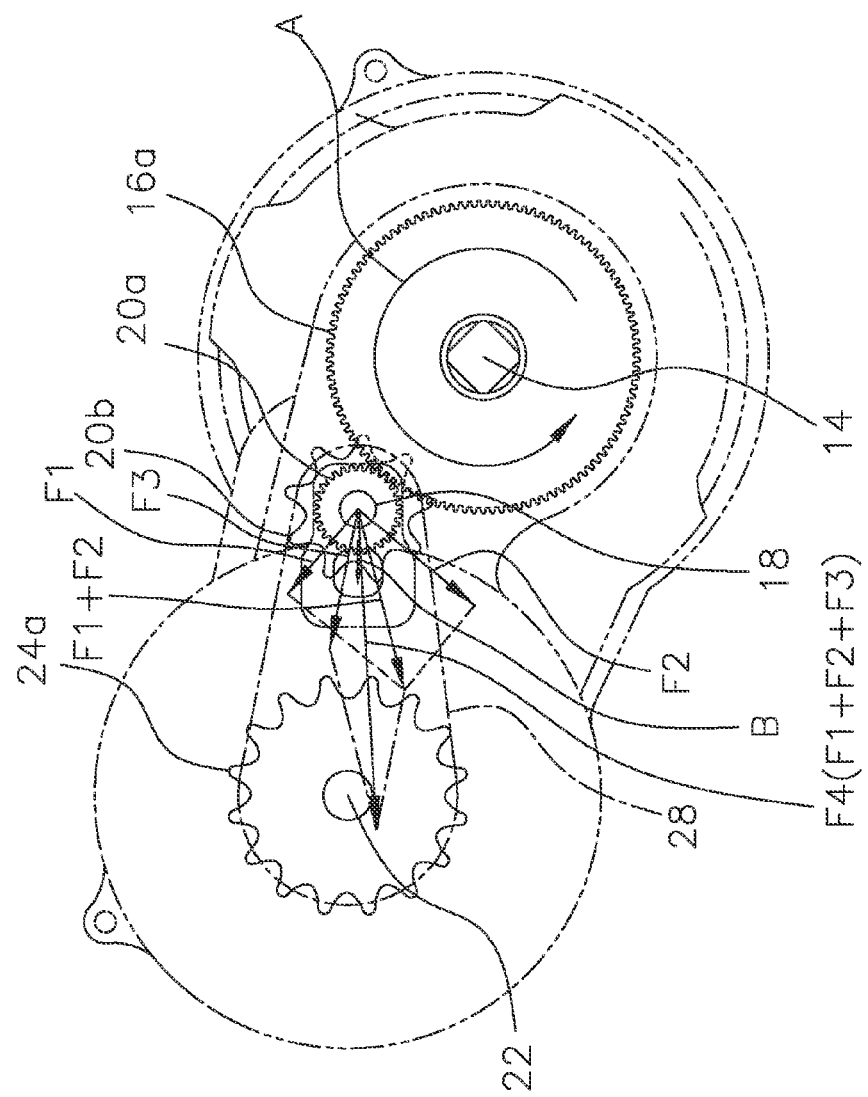
FIG. 6 is a side elevational view of the drive unit having a rotation transmission structure.

The sensor unit 26 is arranged for detecting the torque acting on the crank axle 14 by detecting the force acting on the intermediate axle 18. As the bicycle rider steps on the pedals 100, the crank axle 14 is rotated counter-clockwise as indicated by arrow as shown in FIG. 6. As a result, the first gear 16a presses the second gear 20a in the direction determined by the pressure angle. This pressing force contains the force (first fractional force) F1 in the direction away from the first gear 16a and a force second fractional force) F2 in the tangential direction between the second gear 20a and the first gear 16a. Here, the first fractional force F1 acts in the radial direction of the intermediate axle 18 that supports the first gear 16a and the second gear 20a. The second fractional force F2 acts in the tangential direction at the point where the pitch circle of the first gear 16a and the pitch circle of the second gear 20a are in contact with each other. Also, a tension F3 is generated in the second chain 28 engaged with the first sprocket 20b and the second sprocket 24a. The first fractional force F1 and the second fractional force F2 show an example of a first acting force component. The tension F3 is an example of a second acting force component. Consequently, the force acting on the intermediate axle 18 is the sum force F4 of the first fractional force F1, the second fractional force F2 and the tension F3. This sum force F4 is only of the component of the rotating force acting on the crank axle 14, so that the sum force is not affected by the pedal load, etc. Consequently, by the sensor unit 26, the rotating force (torque) acting on the crank axle 14, that is, the pedaling force, can be detected at with a high degree of precision. The arrow A indicates the direction of rotation of the crank axle 14 when the bicycle moves forward.

Figure 5:
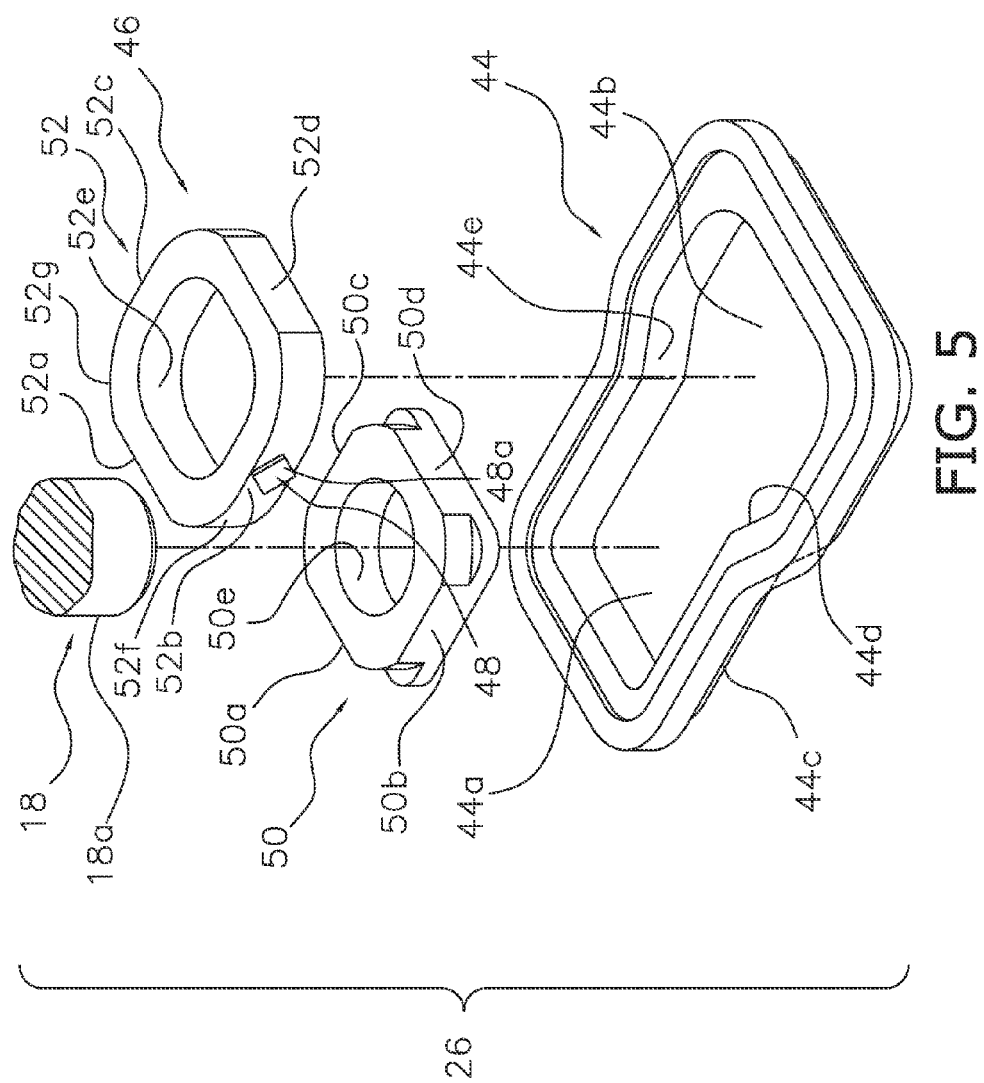
FIG. 5 is an exploded perspective view of the sensor unit illustrated in FIGS. 2 to 4.

As shown in FIGS. 3, 4 and 5, the sensor unit 26 has a sensor case 44, a supporting part 46 that supports the intermediate axle 18, and a sensor 48 that detects the force acting on the intermediate axle 18 via the supporting part 46. The sensor case 44 is fitted into the third hole 13e from the inner side of the housing 12. Here, the third hole 13e has a roughly rectangular shape. The sensor case 44 is, for example, a member made of a metal. The sensor case 44 has a first accommodating section 44a and a second accommodating section 44b formed as recessions from the inner wall surface of the housing 12. The first accommodating section 44a is arranged in the first portion 13f of the third hole 13e. The second accommodating section 44b is arranged in the second portion 13g. The first accommodating section 44a has a width smaller than that of the second accommodating section 44b. The two boundary portions, that is, the first boundary inner wall 44d and the second boundary inner wall 44e, between the first accommodating section 44a and the second accommodating section 44b extend as slopes in the directions opposite to each other and away from each other from the inner wall of the first accommodating section 44a towards the inner wall of the second accommodating section 44b. On the outer side surface of the sensor case 44, the step section 44c engaged with the holding recession 13i of the third hole 13e is formed. As the step section 44c is engaged with the holding recession 13i, the movement of the sensor case 44 outward in the axial direction of the intermediate axle 18 is prohibited.

The supporting part 46 of the sensor unit 26 has the axle supporting portion 50 and the strain-generating portion 52. The axle supporting portion 50 supports the first end portion 18a of the intermediate axle 18. The strain-generating portion 52 is arranged in contact with the axle supporting portion 50. The strain-generating portion 52 is pressed by the axle supporting portion 50 to distort the strain-generating portion. The axle supporting portion 50 roughly has a quadratic prism shape, and the front view of the axle supporting portion has a roughly rectangular shape. The axle supporting portion 50 is accommodated in the first accommodating section 44a of the sensor case 44. The axle supporting portion 50 has a first side surface 50a to a fourth side surface 50d on the outer wall surface around the intermediate axle 18. Each of the first to fourth side surfaces 50a to 50d has a planar shape in the structure. Each of the first to third side surfaces 50a to 50c is arranged in contact with the three inner walls of the first accommodating section 44a. The fourth side surface 50d is arranged in contact with the strain-generating portion 52. The axle supporting portion 50 has a fitting recession 50e where the first end portion 18a of the intermediate axle 18 is fit in the center of the surface. The fitting recession 50e is formed so that the fitting recession does not go through to the back surface of the axle supporting portion 50. The second side surface 50b of the axle supporting portion 50 and the inner wall of the first accommodating section 44a are in planar contact with each other. The second side surface 50b of the axle supporting portion 50 is arranged so that the second side surface goes below the intermediate axle 18 when the drive unit 10 is attached on the frame of the bicycle.

The strain-generating portion 52 is made of, for example, a metal in an annular shape. The strain-generating portion 52 is formed in a quadrangle cylindrical shape with four rounded corners. The strain-generating portion has a roughly rectangular front view. The strain-generating portion 52 has a first side surface 52a through the fourth side surface 52d that form an outer peripheral surface by planes. A through hole 52e is formed at the central portion of the strain-generating portion 52. The through hole 52e has a rectangular front view with four rounded corners. The first side surface 52a facing the axle supporting portion 50 of the strain-generating portion 52 is in contact with the fourth side surface 50d of the axle supporting portion 50. The fourth side surface 52d opposite to the first side surface 52a of the strain-generating portion 52 is in contact with the inner wall of the second accommodating section 44b. The second side surface 52b and the third side surface 52c are arranged to form a gap with the inner wall of the second accommodating section 44b. For the strain-generating portion 52, the first circumferential surface 52f between the first side surface 52a and the second side surface 52b is in contact with the second boundary inner wall 44e. The first circumferential surface 52f between the first side surface 52a and the third side surface 52c of the strain-generating portion 52 is in contact with the first boundary inner wall 44d. For the strain-generating portion 52, the second circumferential surface 52g between the first side surface 52a and the third side surface 52c is in contact with the second boundary inner wall 44e.

The second side surface 52b and the third side surface 52c of the strain-generating portion 52 are pressed by the axle supporting portion 50, so that bending distortion takes place. On the second side surface 52b and/or the third side surface 52c, the strain gauge element 48a that forms the sensor 48 is arranged. Here, suppose the strain gauge element 48a is arranged on the second side surface 52b. However, the strain gauge element may also be arranged on the third side surface 52c or on each of the second side surface 52b and the third side surface 52c. The strain gauge element 48a can be bonded by an adhesive on the strain-generating portion 52. The strain gauge element 48a together with the strain generating section 52 is formed as a module. The strain gauge element 48a is a strain sensor that detects the strain generated in the strain-generating portion 52 when pressed by the axle supporting portion 50.

The sensor unit 26 is arranged such that the direction in which the axle supporting portion 50 presses the strain-generating portion 52, that is, the direction connecting the central axis of the intermediate axle 18 and the central axis of the strain-generating portion 52 (the direction indicated by arrow B as shown in FIG. 6) on the plane perpendicular to the intermediate axle 18 is within a prescribed angle range of θ from the direction of the sum force F4. For example, θ is 90° or smaller, or preferably 45° or smaller, or more preferably 20° or smaller. By arranging the sensor unit 26 in this way, it is easy to detect the force acting on the intermediate axle 18. The direction in which the axle supporting portion 50 presses the strain-generating portion 52 is selected appropriately corresponding to the resolution of the strain gauge element 48a. According to the first illustrated embodiment, in consideration of the sensitivity of the strain sensor, etc., the direction indicated by the arrow B is a little different from the direction of the sum force F4 in a range of 20° or smaller, and the orientation of the sensor unit 26 can be determined corresponding to the sensitivity of the strain sensor adopted. The direction indicated by the arrow B and the direction of the sum force F4 may be in agreement with each other. In this case, the force acting on the strain-generating portion 52 becomes the maximum, and the output of the sensor can be increased.

According to the first illustrated embodiment, when the bicycle having the drive unit 10 attached on the bicycle is set on a flat ground, the direction indicated by the arrow B is shifted from the direction of the sum force F4 so that the contact surface between the second side surface 50b of the axle supporting portion 50 and the inner wall of the first accommodating section 44a becomes near the horizontal surface. As the contact surface between the second side surface 50b of the axle supporting portion 50 and the inner wall of the first accommodating section 44a becomes near the horizontal plane, the axle supporting portion 50 can make contact along the inner wall of the first accommodating section 44a during movement with a high degree of stability. As a result, it is possible to improve the detection precision of the sensor 48.

One can also use a scheme in which, in the sensor case 44, a cover member is arranged to cover the second accommodating section 44b where at least the strain-generating portion 52 is arranged. A step is arranged on the opening portion of the recession on the sensor case 44. The cover member may be engaged with this step, or the cover may be anchored on the sensor case 44 by an adhesive or screws or other anchoring members. The cover member can be applied to cover the entirety of the opening portion of the sensor case 44. In this case, a through hole is formed for inserting the intermediate axle 18 on the cover member.

As shown in FIG. 2, the motor 30 is an inner rotor-type motor. The motor 30 has a motor case 56, a rotor 58 that is supported on the motor case 56 in a freely rotatable way, and a stator 60 installed on the motor case 56. Here, the motor case 56 has a first case 56a formed integrated with the housing 12, and a second case 56b installed detachably on the first case 56a. On the second case 56b, an axle supporting recession 56c that supports the second end portion 18b of the intermediate axle 18 is formed.

The rotor 58 is a cylindrical-shaped member that is arranged coaxial (axially aligned) with the crank axle 14 and that has the crank axle 14 through the rotor. The rotor 58 has a magnet unit 58a having a plurality of magnetic poles arranged side by side in the circumferential direction in the outer peripheral portion. The rotor 58 is supported in a freely rotatable way on the motor case 56 by a pair of bearings 62a and 62b in the form of, for example, ball bearings. The bearings 62a and 62b are arranged on the outer peripheral side of the rotor 58. The bearing 62a is installed on the first case 56a, and the bearing 62b is installed on the second case 56b.

The stator 60 is arranged opposite to the rotor 58 on the outer peripheral side of the rotor 58. The stator 60 has a plurality of coils 60a arranged at a certain interval in the circumferential direction. The stator 60 is anchored on the inner peripheral portion of the first case 56a.

Here, the motor 30 is driven by an inverter not shown in the Figures. The inverter is driven by a controller not shown in the figure, and the controller controls the inverter corresponding to the pedaling force and the speed of the bicycle. In this way, the axle central portion of the motor 30 and the axle central portion of the crank axle 14 are arranged coaxially, so that it is possible to simplify the internal mechanism of the motor 30. As a result, the drive unit 10 can be further simplified.

The transmission mechanism 32 is arranged on the power transmission path between the third rotation transmitting member 24 and the power transmission unit 36. The transmission mechanism 32 has a transmission motor unit 32a and a transmission mechanism main body 32b. The transmission motor unit 32a has the locking body of the transmission mechanism main body 32b rotated to the prescribed phase under the instruction of the rider in the transmission operation section (not shown in the figure) installed on the handle of the bicycle. The transmission motor unit 32a can use the well-known motor unit disclosed in, for example, Japanese Patent No. 3529723. The transmission mechanism main body 32b is a transmission unit that allows selection from a plurality (e.g., eight) gear ratios. As the transmission mechanism main body 32b, for example, the well-known transmission unit disclosed in Japanese Utility Model Registration No. 3146138 can be used.

The transmission mechanism main body 32b has a rotation input section 64 that transmits the rotation of the third rotation transmitting member 24, a transmission unit 66, and a rotation output section 68. The rotation input section 64, the transmission unit 66 and the rotation output section 68 are supported by the supporting axle 22, respectively. The rotation input section 64 is supported in a freely rotatable way on the supporting axle 22. The second sprocket 24a of the third rotation transmitting member 24 is connected to the rotation input section 64 so that they can rotate together as a unit. The transmission unit 66 makes the several steps (e.g., 8 steps) of the speed change including the case of direct connection. The transmission unit 66 has at least one planetary gear mechanism. The rotation output section 68 outputs the rotation after the speed change by the transmission unit 66 to the power transmission unit 36.

In this way, as the transmission mechanism 32 is arranged in the drive unit 10, it is possible to select from a plurality of gear ratios by the transmission mechanism 32. Consequently, assisting driving by the motor 30 can be carried out at a high efficiency. Also, even when an internal transmission unit is adopted as the transmission mechanism 32, as the force acting on the transmission mechanism 32 is small, the transmission operation can be carried out quickly.

Figure 7:
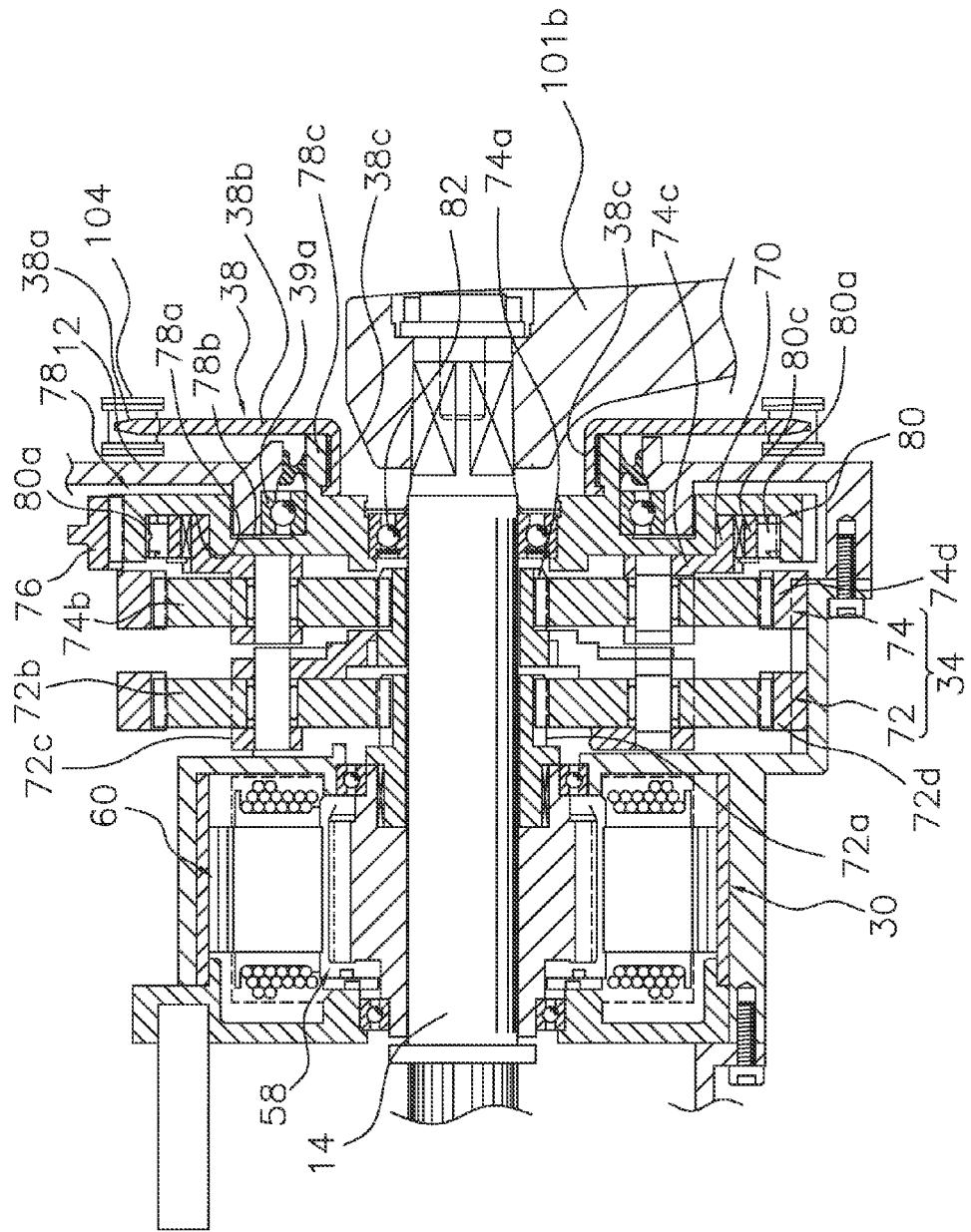
FIG. 7 is an enlarged cross-sectional of a portion of the drive unit near the crank axle as illustrated in FIG. 2.

As shown in FIG. 7, the reduction gear unit 34 transmits the rotation of the rotor 58 to the torque transmitting member 70. The reduction gear unit 34 has one or more gears. In the example shown in FIG. 7, the case in which the reduction gear unit 34 has a first planetary gear mechanism 72 and a second planetary gear mechanism 74 is shown. The first planetary gear mechanism 72 has a first sun gear section 72a connected to the rotor 58, a plurality of first planetary gears 72b, a first carrier section 72c that supports the first planetary gears 72b in a rotatable way, and a first ring gear section 72d anchored in the housing 12. The second planetary gear mechanism 74 has a second sun gear section 74a connected to the first carrier section 72c, a plurality of second planetary gears 74b, a second carrier section 74c that supports the second planetary gears 74b in a freely rotatable way, and a second ring gear section 74d anchored in the housing 12. The output of the reduction gear unit 34 is transmitted via the torque transmitting member 70 to the power transmission unit 36. The torque transmitting member 70 is combined with the second carrier section 74c, and they are integrated with each other here. The torque transmitting member 70 is supported in a freely rotatable way by the second gear member 78 to be explained later of the power transmission unit 36. The torque transmitting member 70 supports a plurality of clutch hooks 80a of the one-way clutch 80.

As shown in FIG. 2, the power transmission unit 36 transmits the rotating force of the motor 30 and the rotating force of the crank axle 14 to the front sprocket 38. The power transmission unit 36 has a first gear member 76 connected to the rotation output section 68 of the transmission mechanism 32 in a reliable way monolithically, a second gear member 78 engaged with the first gear member 76, and a one-way clutch 80.

As shown in FIG. 7, the second gear member 78 is supported in a freely rotatable way via the second bearing 39a on the housing 12. Between the inner peripheral portion of the second gear member 78 and the outer peripheral surface of the crank axle 14, a bearing 82 in the form of, for example, a ball bearing is installed. Consequently, the crank axle 14 is supported in a freely rotatable way via the second gear member 78 on the housing 12.

The second gear member 78 has a first annular recession 78a where the one-way clutch 80 is arranged, a second annular recession 78b where the bearing 82 is arranged, and an annular sprocket installing section 78c where the front sprocket 38 is installed in a rotatable way. The first annular recession 78a is formed in annular shape on the surface of the housing 12 that is opposite to the second side wall 12b. The outer peripheral portion on the inner side in the radial direction of the first annular recession 78a has the torque transmitting member 70 that is supported in a freely rotatable way.

The second annular recession 78b is formed in annular shape on the surface of the housing 12 that is opposite to the second side wall 12b. The inner ring of the second bearing 39b is installed in the second annular recession 78b. The annular sprocket installing section 78c extends in annular shape in the axial direction from the outer peripheral surface on the inner side in the radial direction of the second annular recession 78b. In the second gear member 78, the second annular recession 78b is formed on the inner side of the circumferential direction of the first annular recession 78a. On the inner peripheral surface of the annular sprocket installing section 78c, a connecting section 78d that connects the front sprocket 38 to the annular sprocket installing section 78c in a rotatable way monolithically is arranged. The connecting section 78d can be formed as a serration. The front sprocket 38 is pressed into the connecting section 78d and is anchored by caulking (e.g., press-fitting) with plastic deformation, so that the second gear member 78 and the front sprocket 38 can rotate together as a unit.

The one-way clutch 80 transmits only the rotation of the motor 30 in the direction of driving in the forward motion of the bicycle to the second gear member 78. Consequently, the rotation of the second gear member 78 in the forward moving direction is not transmitted to the motor 30. The one-way clutch 80 is of a hook type. The one-way clutch 80 has a clutch hook 80a, a clutch tooth 80b and an inner side member 80c. The clutch hook 80a is accommodated so that the clutch hook can go up/down freely along the outer peripheral surface of the inner side member 80c, and the clutch hook is energized to the erected posture. The clutch tooth 80b is formed on the inner peripheral surface on the outer side in the radial direction of the first annular recession 78a. The inner side member 80c is formed in annular shape, and the torque transmitting member 70 is connected to the inner peripheral portion of the inner side member 80c in a rotatable way monolithically.

As shown in FIG. 7, the front sprocket 38 has an annular section 38b that has the sprocket teeth 38a and a cylindrical section 38c. The sprocket teeth 38a are formed on the outer peripheral portion. The cylindrical section 38c is formed monolithically on the inner peripheral portion of the annular section 38b. The outer peripheral surface of the cylindrical section 38c is pressed into the inner peripheral portion of the second annular recession 78b, and the tip portion of the cylindrical section 38c is anchored by caulking (e.g., press-fitting). However, the method for anchoring the front sprocket 38 is not limited to the press-in method. One can also use other appropriate methods, such as screwing, bonding, fusion welding, etc.

In the following, the effects of the present embodiment will be explained. For the drive unit 10 in the present embodiment, detection of the pedaling force is made on the force acting on the intermediate axle 18, which receives the rotation of the crank axle 14 transmitted to the intermediate axle and which then transmits the rotation to the supporting axle 22, instead of to the crank axle 14. The force acting on the intermediate axle 18 is generated only due to the transmission of the rotating force from the first rotation transmitting member 16 to the second rotation transmitting member 20 and the transmission of the rotating force from the second rotation transmitting member 20 to the third rotation transmitting member 24. Consequently, without setting a gear holder or another member, it is possible to detect the pedaling force, which varies corresponding to the rotating force acting on the crank axle 14, by detecting the force acting on the intermediate axle 18. As a result, the drive unit 10 can have a simple configuration for detecting the pedaling force.

In the following, the operation of the drive unit 10 will be now explained. The torque generated by the pedaling force of the bicycle rider is transmitted via the transmission mechanism 32 in the following path: the first crank arm 101*a* and the second crank arm 101*b*→the crank axle 14→the first rotation transmitting member 16→the second rotation transmitting member 20→the third rotation transmitting member 24→the transmission mechanism main body 32*b*→the first gear member 76→the second gear member 78. On the other hand, the output torque of the motor 30 is transmitted in the following path: the reduction gear unit 34→the torque transmitting member 70→the one-way clutch 80→the second gear member 78. The second gear member 78 then combines these two torques, and the combined torque is then transmitted to the front sprocket 38. As a result, the assisting function of the motor 30 is realized.

In this case, the force acting on the intermediate axle 18 (the sum force F4) causes a strain of the strain-generating portion 52 of the sensor unit 26. This strain is detected by the strain gauge element 48*a*, the detected strain is taken as the pedaling force, and the assisting control of the motor 30 is carried out corresponding to the pedaling force.

Above, the drive unit 10 is been explained as one example of the present invention. However, the drive unit 10 is not limited to the embodiment. As long as the spirit of the present invention is observed, various modifications can be made. In particular, the several embodiments and modified examples described in the present specification can be combined at will as needed.

Figure 8:
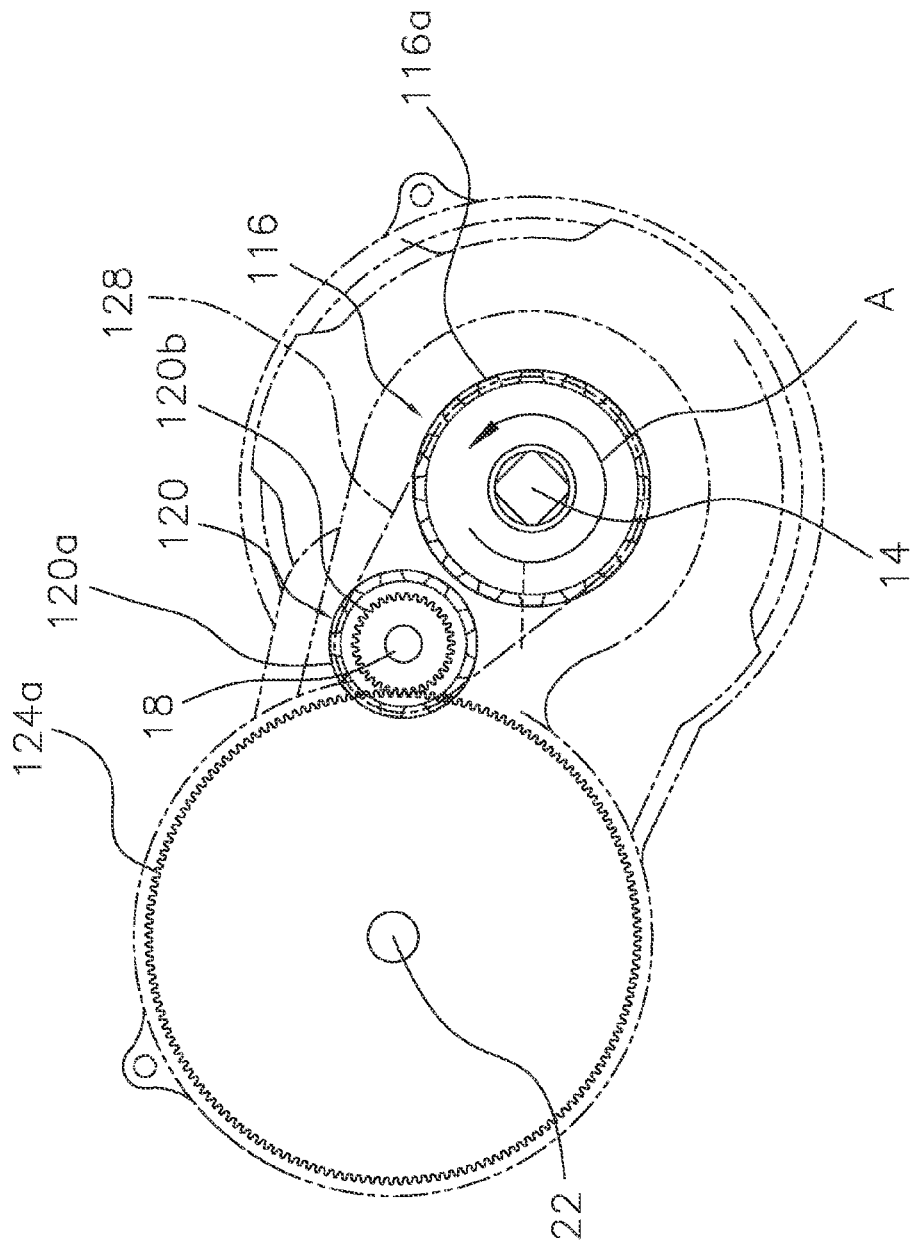
FIG. 8 is a side elevational view, similar to FIG. 5, of a drive unit in accordance with another embodiment.
Figure 9:
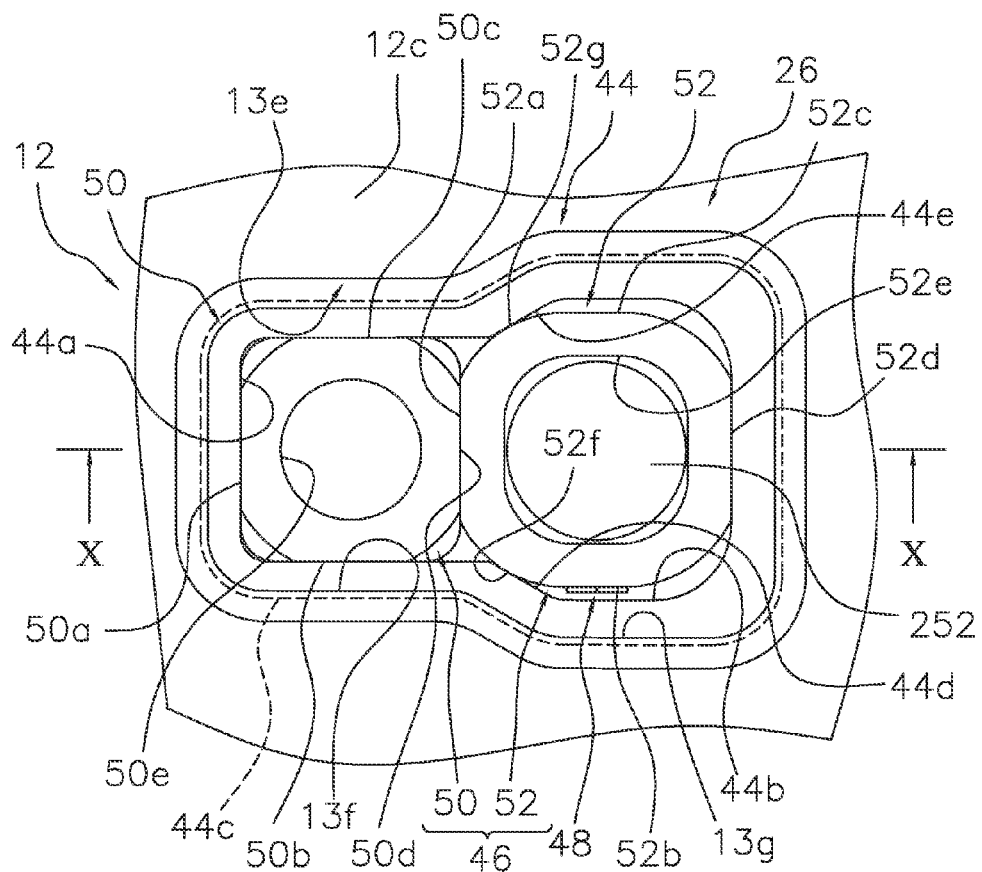
FIG. 9 is an enlarged side elevational view, similar to FIG. 5, of a sensor unit accordance with another embodiment.
Figure 10:
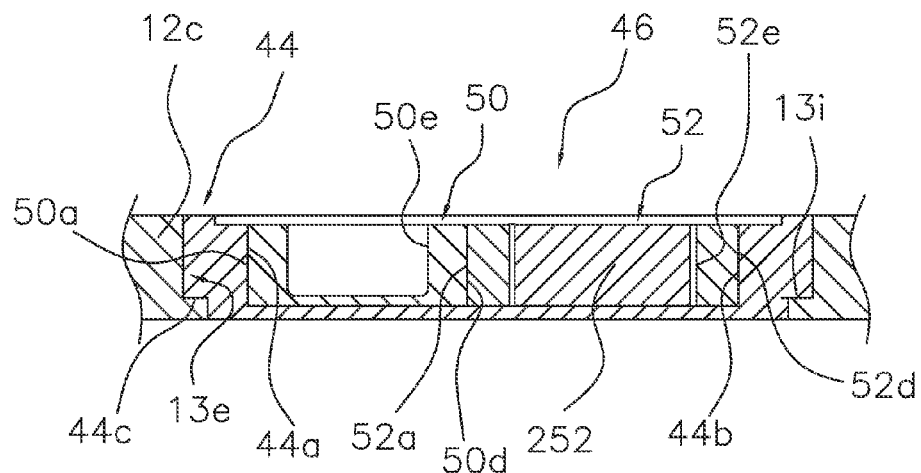
FIG. 10 is a cross-sectional view of the sensor unit as seen along section line X-X in FIG. 9.

(a) In the embodiment described above, the first gear 16*a* is used as the first rotation transmitting member 16, the second gear 20*a* and the first sprocket 20*b* are used as the second rotation transmitting member 20, and the second sprocket 24*a* is used as the third rotation transmitting member 24. However, this is merely an example, and the present invention is not limited to this configuration. For example, as shown in FIG. 8, the first rotation transmitting member 116 contains a first pulley 116*a*. The second rotation transmitting member 120 contains the second pulley 120*a* and the first gear 120*b*. The third rotation transmitting member 124 contains the second gear 124 engaged with the first gear 120*b*. Here, the first pulley 116*a* and the second pulley 120*a* have the belt 128 as the first connecting member wound on them. By the belt 128, the rotation of the first pulley 116*a* is transmitted to the second pulley 120*a*. As shown in FIG. 8, the first pulley 116*a* and the second pulley 120*a* are both toothed pulleys. However, they can also be the conventional V-pulleys or flat pulleys.

The first rotation transmitting member, the second rotation transmitting member, and the third rotation transmitting member may be made of any appropriate parts selected from the group of gears, sprockets, and pulleys.

(b) In the embodiment described above, the bearings are ball bearings or needle-shaped roller bearings. However, the present invention is not limited to them. Any types of bearings that allow the members be installed in a freely rotatable way can be adopted. For example, in addition to the ball bearings and the needle-shaped roller bearings, one may also use other types of roller bearings, as well as bushes or other sliding-type bearings.

(c) In the embodiment described above, the motor 30 and the transmission mechanism 32 are arranged in the drive unit 10. However, the present invention is not limited to this configuration. As other embodiments of the present invention, one can also use a configuration in which the motor and the transmission mechanism are not arranged. For example, one can also use a configuration in which the third rotation transmitting member is arranged on one end of the supporting axle, and the first gear member is installed on the other end in a freely rotatable way monolithically. In addition, one can also use a scheme in which only a transmission mechanism is arranged yet the motor is not arranged. When the motor is not arranged, the one-way clutch in the reduction gear unit and the power transmission unit may be not arranged. When only the motor is arranged yet no transmission mechanism is set, one can use a configuration in which the third rotation transmitting member is arranged on one end of the supporting axle, and the first gear member is arranged on the other end of the supporting axle.

(d) In the embodiment described above, a strain gauge element is adopted as the sensor for detecting the strain of the strain-generating portion 52. However, one can also use a semiconductor sensor that can detect the strain. Any strain sensor that can detect the strain of the strain-generating portion 52 can be used.

(e) In the embodiment described above, the housing 12 is made of a metal. However, a portion or the entirety of the housing can also be made of a synthetic resin.

(f) In the embodiment described above, the sensor case 44 is formed as a body separated from the housing 12. However, the sensor case 44 and the housing 12 can also be integrated with each other. In this case, a recession is arranged on the first side wall 12*a* of the housing 12, and the axle supporting portion 50 and the strain-generating portion 52 are arranged in this recession.

(g) In the embodiment described above, a strain sensor is arranged in the strain-generating portion 52. However, the strain sensor can also be arranged on the intermediate axle 18 itself. In this case, the strain of the intermediate axle 18 is directly detected.

(h) In the embodiment described above, the strain-generating portion 52 is formed in annular shape. However, the shape of the strain-generating portion 52 is not limited to this. The strain-generating portion may take a shape that allows easy distortion when pressed by the axle supporting portion 50.

(i) In the embodiment described above, a space is formed on the inner peripheral side of the strain-generating portion 52. However, one can also use a configuration in which a deformation suppressing member 252 that suppresses excessive deformation of the strain-generating portion 52 is arranged on the inner peripheral side of the strain-generating portion 52. The deformation suppressing member 252 has an outer diameter nearly equal to or a little smaller than the inner diameter of the strain-generating portion 52. The deformation suppressing member 252 is formed in cylindrical shape here. However, the shape of the deformation suppressing member is not limited to the cylindrical shape. The deformation suppressing member may also have a square pillar shape or another shape. The hardness of the deformation suppressing member 252 is greater than that of the strain-generating portion 52. As a result, when an excessive force is applied to the strain-generating portion 52 via the intermediate axle 18, the strain-generating portion 52 contacts the deformation suppressing member 252, so that deformation of the strain-generating portion 52 is suppressed. As a result, it is possible to prevent plastic deformation of the strain-generating portion 52, and damage to the sensor that measures the pedaling force can be prevented.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, atone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   a first axle configured to be rotated by a crank arm;
   a first rotation transmitting member arranged on the first axle to transmit rotation of the first axle by the crank arm;
   a second axle spaced from the first axle;
   a second rotation transmitting member arranged on the second axle, and operatively engaged with the first rotation transmitting member to transmit rotation of the first rotation transmitting member;
   a third axle spaced from the first axle and the second axle;
   a third rotation transmitting member arranged on the third axle, and operatively engaged with the second rotation transmitting member to transmit rotation of the second rotation transmitting member;
   an acting force detecting unit arranged to detect a force acting on the second axle; and
   a housing that accommodates the first, second, and third rotation transmitting members,
   the first rotation transmitting member, the second rotation transmitting member, and the third rotation transmitting member being arranged in a rotation transmitting path between the first axle and a front sprocket.

2. The bicycle drive unit according to claim 1, wherein
   the second rotation transmitting member is rotatably supported on the second axle to rotate with respect to the second axle.

3. The bicycle drive unit according to claim 1, wherein
   the third rotation transmitting member is rotatably supported on the third axle to rotate with respect to the third axle.

4. The bicycle drive unit according to claim 1, wherein
   the first axle, the second axle and the third axle are arranged parallel with respect to each other.

5. The bicycle drive unit to claim 1, wherein
   the first rotation transmitting member, the second rotation transmitting member and the third rotation transmitting member are made of parts selected from the group consisting of gears, sprockets and pulleys.

6. The bicycle drive unit according to claim 1, wherein
   the first rotation transmitting member and the second rotation transmitting member are in direct contact with each other.

7. The bicycle drive unit according to claim 1, further comprising
   a first connecting member transmitting the rotation of the first rotation transmitting member to the second rotation transmitting member.

8. The bicycle drive unit according to claim 1, further comprising
   a second connecting member transmitting the rotation of the second rotation transmitting member to the third rotation transmitting member.

9. The bicycle drive unit according to claim 1, further comprising
   a chain engaged a first sprocket of the second rotation transmitting member and a second sprocket of the third rotation transmitting member to transmit the rotation of the second rotation transmitting member to the third rotation transmitting member,
   the first rotation transmitting member including a first gear and the second rotation transmitting member including a second gear engaged with the first gear, the first sprocket being connected to the second gear such that the first sprocket rotates with the second gear as a unit.

10. The bicycle drive unit according to claim 1, wherein
    the first axle is a crank axle, and the first rotation transmitting member is fixed on the first axle.

11. A bicycle drive unit comprising:
    a first axle configured to be rotated by a crank arm;

a first rotation transmitting member arranged on the first axle to transmit rotation of the first axle by the crank arm;
a second axle spaced from the first axle;
a second rotation transmitting member arranged on the second axle, and operatively engaged with the first rotation transmitting member to transmit rotation of the first rotation transmitting member;
a third axle spaced from the first axle and the second axle;
a third rotation transmitting member arranged on the third axle, and operatively engaged with the second rotation transmitting member to transmit rotation of the second rotation transmitting member; and
an acting force detecting unit arranged to detect a force acting on the second axle,
the first rotation transmitting member being engaged with the second rotation transmitting member to apply a first acting force component of the force acting on the second axle that acts in a radial direction of the second axle due to transmission of the rotation from the first rotation transmitting member to the second rotation transmitting member, and
the second rotation transmitting member being engaged with the third rotation transmitting member to apply a second acting force component of the force acting on the second axle that acts in the radial direction of the second axle due to transmission of the rotation from the second rotation transmitting member to the third rotation transmitting member.

12. The bicycle drive unit according to claim 11, wherein the acting force detecting unit has a supporting part that supports the second axle and a sensor that detects the force acting on the second axle via the supporting part.

13. The bicycle drive unit according to claim 12, wherein the sensor is arranged to directly detect a strain of the supporting part, which is generated by the force acting on the second axle.

14. The bicycle drive unit according to claim 13, wherein the supporting part has an axle supporting portion that supports an end portion of the second axle, and a strain-generating portion in contact with the axle supporting portion.

15. The bicycle drive unit according to claim 13, wherein the sensor includes a strain gauge element.

16. The bicycle drive unit according to claim 12, further comprising
a housing accommodating the first rotation transmitting member, the second rotation transmitting member and the third rotation transmitting member, and the supporting part is supported in the housing.

17. A bicycle drive unit comprising:
a first axle configured to be rotated by a crank arm;
a first rotation transmitting member arranged on the first axle to transmit rotation of the first axle by the crank arm;
a second axle spaced from the first axle;
a second rotation transmitting member arranged on the second axle, and operatively engaged with the first rotation transmitting member to transmit rotation of the first rotation transmitting member;
a third axle spaced from the first axle and the second axle;
a third rotation transmitting member arranged on the third axle, and operatively engaged with the second rotation transmitting member to transmit rotation of the second rotation transmitting member; and
an acting force detecting unit arranged to detect a force acting on the second axle,
the second rotation transmitting member and the third rotation transmitting member are in direct contact with each other.

18. A bicycle drive unit comprising:
a first axle configured to be rotated by a crank arm;
a first rotation transmitting member arranged on the first axle to transmit rotation of the first axle by the crank arm;
a second axle spaced from the first axle;
a second rotation transmitting member arranged on the second axle, and operatively engaged with the first rotation transmitting member to transmit rotation of the first rotation transmitting member;
a third axle spaced from the first axle and the second axle;
a third rotation transmitting member arranged on the third axle, and operatively engaged with the second rotation transmitting member to transmit rotation of the second rotation transmitting member;
an acting force detecting unit arranged to detect a force acting on the second axle;
a first connecting member transmitting the rotation of the first rotation transmitting member to the second rotation transmitting member; and
a second connecting member transmitting the rotation of the second rotation transmitting member to the third rotation transmitting member,
the first connecting member and the second connecting member being selected from the group consisting of chains or belts.

19. A bicycle drive unit comprising:
a first axle configured to be rotated by a crank arm;
a first rotation transmitting member arranged on the first axle to transmit rotation of the first axle by the crank arm;
a second axle spaced from the first axle;
a second rotation transmitting member arranged on the second axle, and operatively engaged with the first rotation transmitting member to transmit rotation of the first rotation transmitting member;
a third axle spaced from the first axle and the second axle;
a third rotation transmitting member arranged on the third axle, and operatively engaged with the second rotation transmitting member to transmit rotation of the second rotation transmitting member;
an acting force detecting unit arranged to detect a force acting on the second axle;
a power transmission unit transmitting a rotating force of the third rotation transmitting member; and
a motor operatively coupled to the power transmission unit to apply a driving force on the power transmission unit.

20. The bicycle drive unit according to claim 19, wherein the first axle and a rotating axle of the motor are arranged coaxially.

21. The bicycle drive unit according to claim 19, further comprising
a transmission mechanism arranged in the power transmission path between the third rotation transmitting member and the power transmission unit.

22. The bicycle drive unit according to claim 19, further comprising
a one-way clutch arranged to transmit a drive force of the motor to the power transmission unit.

* * * * *